United States Patent [19]

Palentyn et al.

[11] Patent Number: 4,708,390
[45] Date of Patent: Nov. 24, 1987

[54] LASER CONTOUR CUT DOOR BEAMS

[75] Inventors: Gunther H. Palentyn, Grand Blanc; James R. Dehlinger, Ada; Donald R. Rigsby, Jenison, all of Mich.

[73] Assignee: Benteler Corporation, Grand Rapids, Mich.

[21] Appl. No.: 890,338

[22] Filed: Jul. 29, 1986

Related U.S. Application Data

[62] Division of Ser. No. 798,299, Nov. 15, 1985, Pat. No. 4,636,608.

[51] Int. Cl.$^4$ ................................................ B60J 5/04
[52] U.S. Cl. .......................................... 296/188; 296/146; 52/731; 403/334; 403/167
[58] Field of Search ............... 296/188, 189, 146, 205; 49/501, 502; 52/731; 248/251; 403/334, 167

[56] References Cited

U.S. PATENT DOCUMENTS 2,200,555  5/1940  Krogh ................................... 49/502

FOREIGN PATENT DOCUMENTS 2425338  1/1980  France .................................. 296/146
1028534  7/1983  U.S.S.R. ............................... 296/146

Primary Examiner—Dennis H. Pedder
Attorney, Agent, or Firm—Price, Heneveld, Cooper, DeWitt & Litton

[57] ABSTRACT

A contour cut door beam for automobiles, and apparatus and method of forming same. A steel tube is contour cut with a laser beam from a source offset from an operative axis coincident with the tube axis, using simultaneous rotational and linear advancement between the tube and cutting beam to form an arcuate outer end terminus on the tube in a plane transverse to the axis, an arcuate inner terminus on the opposite side of the tube in a second plane transverse to the axis, and a pair of mirror image contoured edges joining said termini, with all portions being on radii relative to said axis.

2 Claims, 7 Drawing Figures

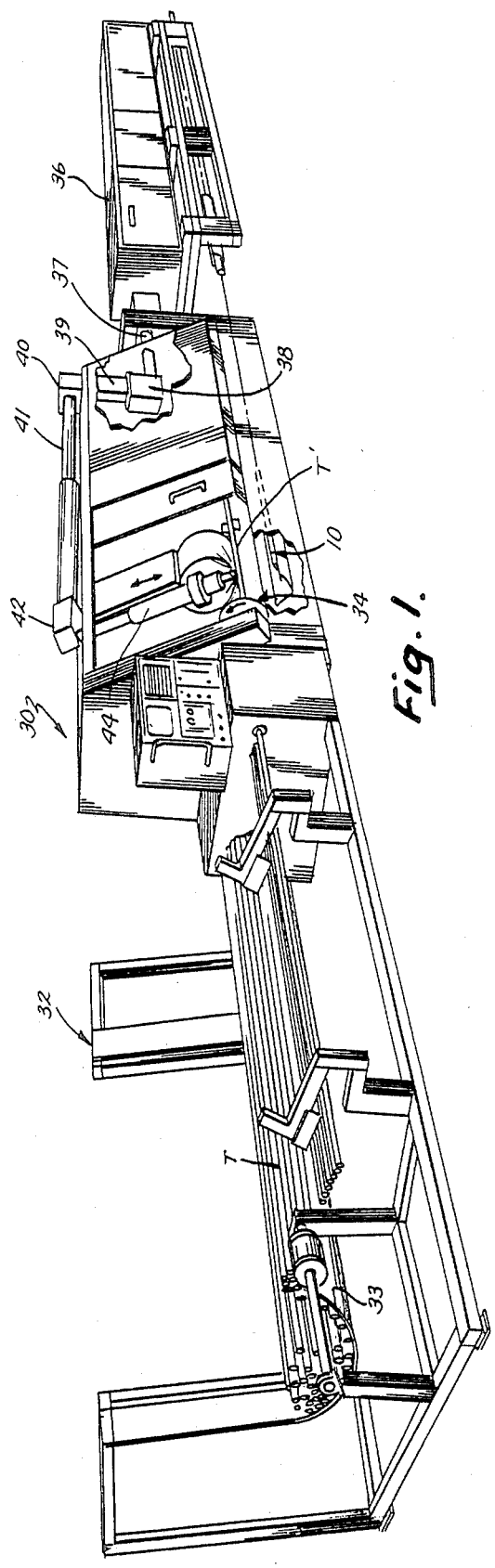
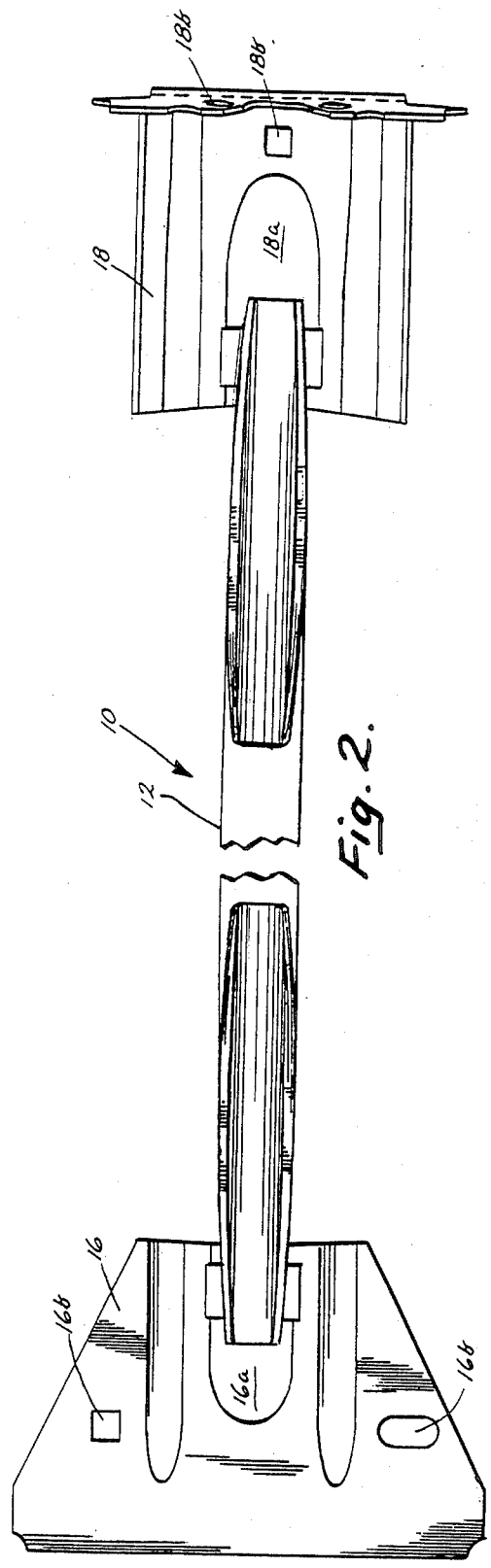

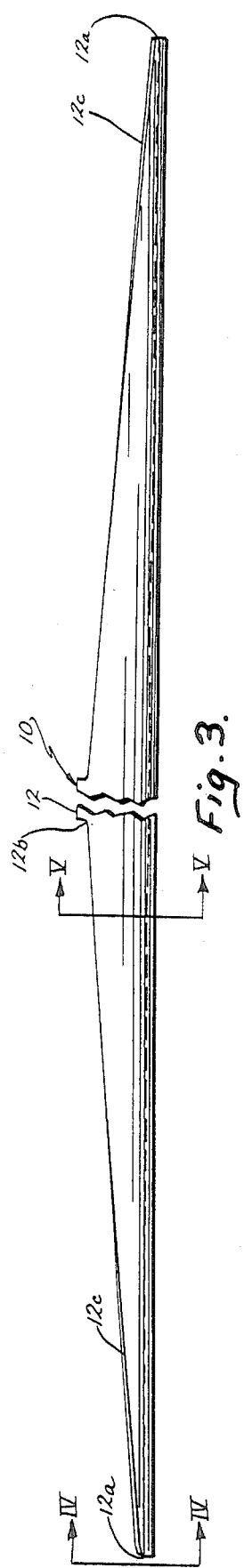
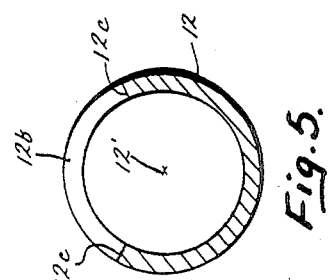
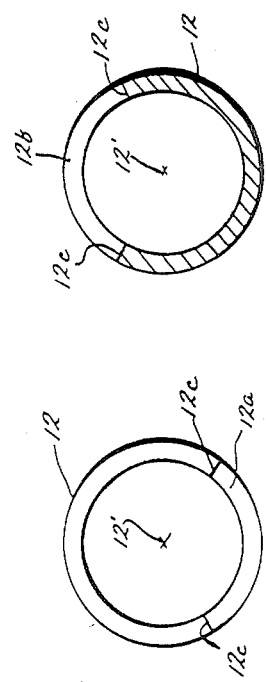
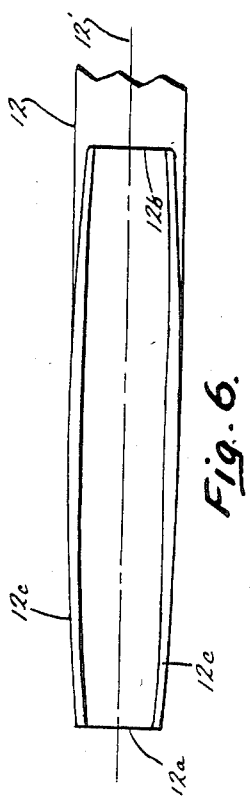
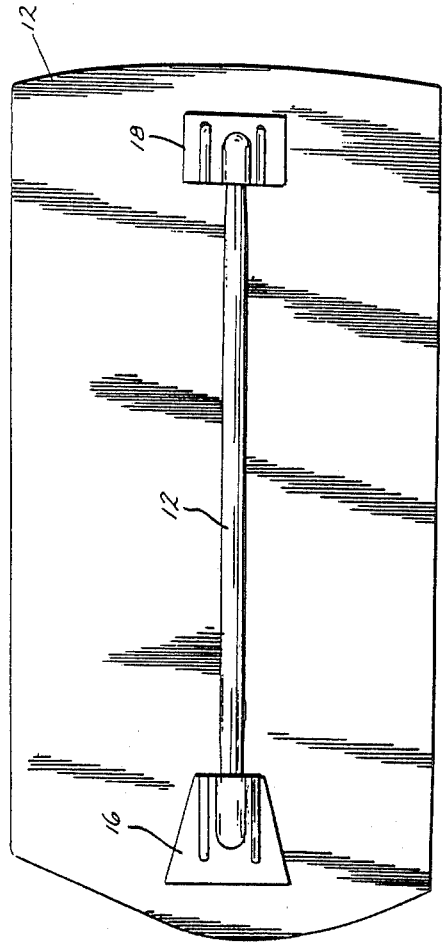

LASER CONTOUR CUT DOOR BEAMS

This is a division of application Ser. No. 06/798,299, filed Nov. 15, 1985, U.S. Pat. No. 4,636,608.

BACKGROUND OF THE INVENTION

This invention relates to impact door beams for reinforcing the doors of automobiles. These impact beams extend horizontally inside the door to help protect the occupants in the event of a broadside collision.

Impact door beams presently are made of steel tubular members having the ends thereof attached to brackets sometimes called extensions which are secured to door panels inside the door. Such tubular members are largely of two types, one being a tube cut off at both ends, and the other being a tube which is press formed at one end. The tubes are typically cut off with an abrasive wheel or a cutting torch. Such techniques are relatively slow and also leave burrs, slag, rough edges, and related undesirable conditions. Moreover, the tubular ends of the beams are sometimes difficult to fit smoothly into streamlined curved automobile doors. It would be desirable to shape the ends of the tubular beam to allow greater design freedom for the door, yet without requiring pressure forming techniques.

SUMMARY OF THE INVENTION

The present invention involves special contour cutting of the ends of impact door beams to enable greater design freedom relative to the door, the contouring being achieved by laser cutting of the end portions of the beam in a pattern that retains strength to meet safety specifications. The resulting impact beam is lighter in weight. The contour laser cutting results in two like beam components being created from the operation, thereby avoiding waste of material. The action is relatively fast and efficient, and can be automatically achieved.

Apparatus for this contour cutting of door beams includes a laser source offset from the operative axis for the tube, its laser beam oriented radially toward the operative axis, and includes means for rotating the tube about the axis and imparting linear motion between the beam and tube in two directions along the axis to create a contoured edge surface in the wall of the tube, all portions of which edge surface are on radii relative to said operative axis.

BRIEF DESCRIPTION OF THE DRAWINGS

FIG. 1 is a perspective view of apparatus for making the door beam according to this invention.

FIG. 2 is an elevational view of a door beam with extensions, according to this invention;

FIG. 3 is a fragmentary plan view of the door beam in FIG. 2;

FIG. 4 is an end elevational view taken on plane IV—IV of FIG. 3;

FIG. 5 is a sectional view taken on plane V—V of FIG. 3;

FIG. 6 is a fragmentary, enlarged elevational view of one end of the door beam; and FIG. 7 is an elevational view of an automobile inner door panel having the door beam assembly attached thereto.

DESCRIPTION OF THE PREFERRED EMBODIMENT

Referring now specifically to the drawings, the elongated door beam 10 there depicted has a generally tubular cylindrical body 12 of steel, with specially configurated end portions. This structural impact tube 12 has a peripheral wall around a central axis 12' (FIGS. 4-6), and a pair of opposite contoured end portions. Each end portion has an outer terminus 12a (FIGS. 3 & 4) in the form of an arcuate surface extending through an obtuse angle at the axial end of the tube in a plane transverse to tube axis 12'. Each end portion also has an inner terminus 12b (FIG. 3) on the opposite diametral side of the tube, and axially spaced from the outer terminus first mentioned. This second inner terminus also comprises an arcuate surface extending through an obtuse angle of the tube in a second plane transverse to tube axis 12'. A pair of wall edges 12c, all portions of which are on radii relative to the tube axis (see e.g. FIGS. 4 & 5) to form a compound curvature, join the two arcuate wall surfaces forming the inner and outer termini 12a and 12b. These diagonal wall surfaces 12c have a length several times the length of the arcuate termini and several times the diameter of the door beam tube. The configuration of these composite end portions, including the compound curvature of surfaces 12c, enables the tube to have considerably less weight, but meet the automotive impact strength specifications.

This impact door beam is normally interfitted with a pair of end extensions, i.e. brackets, for assembly to a door panel within a vehicle door. Specifically, the ends of tube 12 are secured as by welding to a pair of extension brackets 16 and 18 which vary considerably in configuration depending upon the vehicle model and size. These brackets typically have stamped recess cavities 16a and 18a (FIG. 2) receiving the ends of the beam. The brackets have appropriate orifices 16b and 18b for fasteners to secure them to a conventional inner door panel 20 (FIG. 7) of the vehicle door assembly.

The specially configured end portions of the door beam, with the curvilinear wall surfaces all on radii relative to the tube axis are laser cut while specifically controlling the rotational orientation and linear feed movement between the tube and the laser beam. Referring to FIG. 1, the apparatus 30 there depicted includes a bundle unscrambler and loader subassembly 32 which receives a plurality of steel tubes T in a sling 33. These tubes are several times the length of the door beams to be formed therefrom. Tubes T are individually fed axially into a tube clamping and rotating subassembly 34 which grips the tube and rotates it controlled amounts. The tube rotation is combined with linear movement of a laser beam which is directed along the axis 12' of the tube.

A laser source 36 such as a 1250 watt carbon dioxide cutting laser provides a laser beam which is directed to the beam tube by being reflected on mirrors to orient the laser beam toward the axis of the work piece tube.

Specifically, the laser beam generated at source 36 is directed through conduit shield 37 to mirror 38, deflected 90 degrees up by mirror 38 through shield 39 to mirror 40, and deflected 90 degrees by mirror 40 through horizontally telescopic conduit shield 41 to mirror 42, and then deflected by mirror 42 down vertically telescopic conduit shield 44 toward the work piece tube T' to be cut. By moving reflector 42 linearly to the work piece (or otherwise causing relative linear feed movement between the laser beam and the tube) as the work piece rotates in controlled amounts simultaneously, the specially configured end portion of the door beam is created. Specifically, during the cutting operation, the laser beam forms either the inner or the outer terminus arcuate wall surface first by rotation of the tube through an acute angle while restraining the linear feed, then gradually rotating the tube further while the laser beam is advanced linearly relative to the center line of the tube to create the curvilinear diagonal surface on one side of the tube. The linear feed is then arrested and the tube is rotated through another acute angle to form the other terminus. Finally, the linear feed between the laser and tube is reversed and the tube is also again rotated a like amount while the linear feed occurs, to form the second (opposite) diagonal surface of the same length and configuration as the first one, but in mirror image thereto.

The complete tube is then advanced and another like cut is repeated. With each such cut, two like end portions of two successive beams are formed, i.e. the rear end portion of the front beam and the front end portion of the rear beam. There is no wasted piece of tube created.

After the forward end and the rearward end of an individual beam are laser cut according to the above teaching, the beam is dropped down as noted at 10 in FIG. 1, and advanced.

Conceivably, the disclosed preferred embodiment of the invention may be modified in minor ways to accommodate particular apparatus or particular vehicles. The invention is intended to be limited only by the scope of the appended claims and the equivalents thereto.

The embodiments of the invention in which an exclusive property or privilege is claimed are defined as follows:

1. An automobile impact door beam comprising:
    an elongated structural tube having a peripheral wall around a central axis along its length, and contoured end portions of said tube, each end portion having an outer terminus comprising an arcuate edge surface of said tube wall in a plane transverse to said axis, an inner terminus comprising an arcuate edge surface of said tube wall in a second plane transverse to said axis, and a pair of mirror image wall edge surfaces tapering from said inner to said outer terminus and joining ends of said arcuate edge surfaces to form a contoured end portion of said door beam.

2. The impact door beam of claim 1 wherein said arcuate edge surfaces of said outer terminus and said inner terminus each extend through an arc of an obtuse angle.

* * * * *